May 25, 1965     M. W. HEMPHILL     3,185,442
TIMBER WEDGE
Filed Dec. 3, 1962
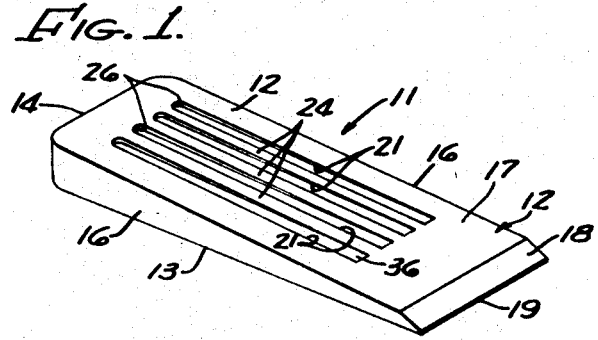
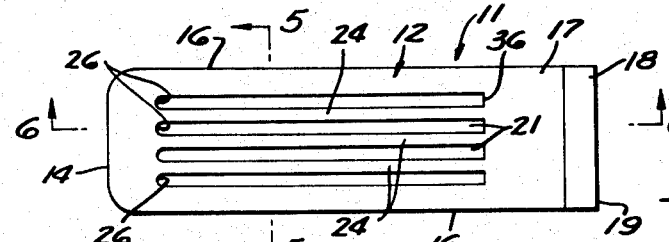
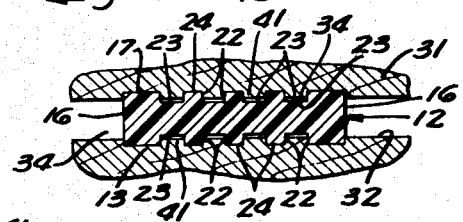
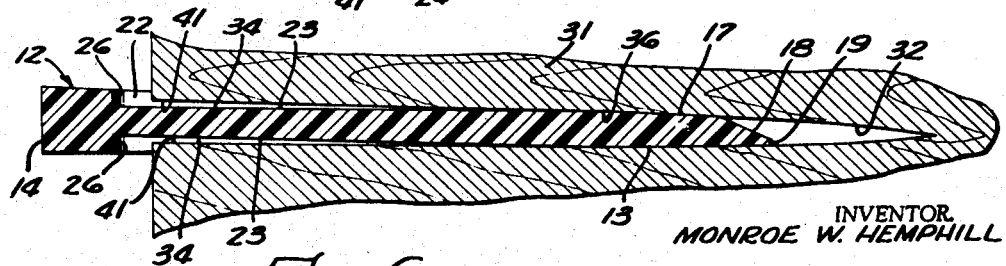
INVENTOR.
MONROE W. HEMPHILL
BY Lothrop & West
ATTORNEYS.

United States Patent Office 3,185,442
Patented May 25, 1965

3,185,442
TIMBER WEDGE
Monroe W. Hemphill, P.O. Box 213, Grass Valley, Calif.
Filed Dec. 3, 1962, Ser. No. 241,722
4 Claims. (Cl. 254—104)

The invention relates to improvements in wedges of the type used in felling trees.

Wedges for felling trees are driven into a saw kerf in order to cause a tree to be tipped and to direct its angle of fall. A principal object of my invention is to produce a felling wedge with an integral body of plastic or similar material having a planar lower face and a planar upper face with said faces inclined at a small subtended angle with respect to each other and with a butt end lying normal to the lower face. A sharpened chisel-like edge surface is a continuation of said lower planar face and defines a sharpened edge subtending a greater angle with said upper face than the angle between the upper and lower faces. Both faces of the wedge are provided with plural parallel grooves spaced apart and separated by plane lands, the grooves tapering obliquely toward one end to merge with the upper planar face and being indented into said upper face at the opposite end of said grooves, thus to promote easy entry of the wedge into the faces of the saw kerf into which a wedge is to be driven.

It is therefore an object of the invention to provide a timber wedge which tends to maintain its alignment while being driven.

It is another object of the invention to provide a timber wedge which is light, yet strong and tough, and which is highly resistant to impact.

It is a further object of the invention to provide a timber wedge the surfaces of which possess a low coefficient of friction and which, therefore, is easier to drive.

It is another object of the invention to provide a generally improved timber wedge.

Other objects, together with the foregoing, are attained in the embodiment described in the following description and shown in the accompanying drawings, in which:

FIG. 1 is a top perspective view;
FIG. 2 is a side elevational view;
FIG. 3 is a bottom plan;
FIG. 4 is a top plan;
FIG. 5 is a transverse sectional view, showing the wedge lodged in a timber saw cut, the plane of the section being indicated by the line 5—5 in FIG. 4; and
FIG. 6 is a longitudinal sectional view, showing the wedge driven partially into a timber saw cut, the plane of the section being indicated by the line 6—6 in FIG. 4.

While the timber wedge of the invention is susceptible of numerous physical embodiments, depending on the environment and requirements of use, substantial numbers of the herein shown and described embodiment have been made and used, and all have performed in an eminently satisfactory manner.

The device of the invention, generally designated by reference numeral 11, comprises a wedge-shaped block 12 of material which is non-metallic, rigid, impact-resistant and possessing a low coefficient of friction. It has been found that cast "nylon" provides these characteristics to a very favorable degree.

The wedge 12 includes a planar base 13, or bottom surface, a butt end 14 and a pair of sides 16 perpendicular to the base 13. A top face 17, or upper surface, is also planar and extends from the butt end 14 toward the other end inclined at a small angle with respect to the plane of the base. Adjacent the forward end of the wedge, there is provided a chisel-like portion 18, or chisel face, terminating in a narrow leading tip portion 19, the portion 19 being at right angles to the base; and, while the tip 19 is quite thin, it is preferably not a sharp edge.

Commencing at a location removed somewhat from the butt end and extending toward the tip end is a plurality of longitudinal, spaced, parallel grooves 21 formed both in the lower face 13 and in the upper face 17.

As appears most clearly in FIGS. 5 and 6, each of the grooves is defined by a pair of opposed side walls 22 and a floor 23, or bottom wall. Separating the grooves 21 is a plurality of lands 24.

Whereas the butt ends of the grooves are defined by back walls 26, the groove floors merge imperceptibly at their forward ends, with the corresponding wedge faces. As is illustrated most clearly in FIGS. 2 and 6, the groove floors on opposite surfaces of the wedge are not parallel; instead, the groove floors of the upper surface grooves are preferably parallel to the plane of the base and the groove floors of the lower surface grooves are preferably parallel to the plane of the inclined upper surface, the result being that the planes of the opposed floors diverge somewhat in proceeding from the butt end toward the tip end.

This conformation provides a degree of relief to the deformation of the wood 31 in a saw cut 32 into which the wedge is driven by blows on the butt end 14, in customary fashion. This relief is shown, to an exaggerated degree in FIG. 6 and is designated by the numeral 34.

In other words, adjacent the forward end 36 of the groove where the floor merges into the face, the initial "biting" effort of the lands and the grooves is considerable. Then, as the wedge is driven farther into the cut, the wood, although resiliently deformed into the grooves (see FIGS. 5 and 6) does not extend clear to the floor. This means that friction is reduced, the wood not being in contact with the floors throughout their entire length. At the same time, however, the portions 41 of the wood deformed into the grooves and bearing against the side walls of the grooves are highly effective in preventing lateral or angular slewing of the wedge even though the butt end is not given a square blow.

The low coefficient of friction of the block material still further reduces the effort required to drive the wedge but does not in any way detract from the resistance to skewing provided by the side walls of the grooves which confine the deformed lands 41 of wood.

Furthermore, the wedge does not produce any sparks when struck by the sledge, thus reducing the hazard of fire; and it does not splinter or chip, as do metal wedges, with the result that the likelihood of injury to the workman, and particularly to his eyes, is minimized by use of the device of the present invention.

It can therefore be seen that I have provided a safe, light yet rugged and highly effective timber wedge.

What is claimed is:

1. A timber falling device comprising an elongated wedge-shaped block of rigid, non-metallic and impact-resistant material, said wedge shaped block including a lower surface and an upper surface inclined thereto, both of said surfaces having formed therein a plurality of spaced, parallel, elongated grooves, said grooves each being defined by a pair of opposed, facing side walls and a bottom wall, said bottom walls of said grooves formed in said lower surface being substantially parallel to the plane of said upper surface, and said bottom walls of said grooves formed in said upper surface being substantially parallel to the plane of said lower surface.

2. The device of claim 1 wherein the ends of said grooves adjacent the thinner end of said wedge-shaped block terminate at the planes of said upper and lower surfaces.

3. A timber falling wedge comprising an elongated block of non-metallic, rigid and impact-resistant material, said block being defined by a planar lower face, a planar upper face inclined at a low angle with respect to said lower face, a pair of parallel side surfaces perpendicular to said lower face, an end surface at one end of said block perpendicular to said lower face, a chisel-like surface adjacent the other end of said block extending from said upper face toward said lower face and terminating in a tip portion perpendicular to said side surfaces, and a plurality of spaced paralel elongated grooves separated by plane faced lands, said grooves being formed in said lower face and in said upper face, said elongated grooves being deeper at the ends adjacent said one end of said block than at the groove ends adjacent the other end of said other block.

4. The device of claim 3 wherein the material of said block is characterized by having a low coefficient of friction.

References Cited by the Examiner
UNITED STATES PATENTS

| | | | |
|---|---|---|---|
| 1,544,331 | 6/25 | Malmgren | 254—104 |
| 2,733,894 | 2/56 | Overman | 254—104 |
| 3,021,112 | 2/62 | Forman | 254—104 |

OTHER REFERENCES

"Shapleigh Hardware Co." 1942 Section 1, Page 51.

WILLIAM FELDMAN, *Primary Examiner.*